United States Patent [19]

Mann

[11] Patent Number: 4,931,017
[45] Date of Patent: Jun. 5, 1990

[54] STENCIL BOOK

[75] Inventor: Philip Mann, Hartsdale, N.Y.

[73] Assignee: Grosset & Dunlap, Inc., New York, N.Y.

[21] Appl. No.: 325,000

[22] Filed: Mar. 17, 1989

Related U.S. Application Data

[63] Continuation-in-part of Ser. No. 103,738, Oct. 2, 1987, abandoned, which is a continuation-in-part of Ser. No. 849,530, Apr. 8, 1986, abandoned.

[51] Int. Cl.$^5$ .............................................. G09B 11/04
[52] U.S. Cl. ...................................... 434/87; 446/147
[58] Field of Search ...................... 434/85, 87, 88, 89, 434/96, 159, 161, 171, 403, 406, 407, 164, 165; 446/147, 149

[56] References Cited

U.S. PATENT DOCUMENTS

| | | | |
|---|---|---|---|
| 148,291 | 3/1874 | Fowler | 434/87 X |
| 1,065,562 | 6/1913 | Spoerer | 446/149 |
| 1,425,597 | 8/1922 | La Borie | 434/87 |
| 2,201,479 | 5/1940 | Davidson | 446/147 X |
| 2,812,183 | 11/1957 | Schiff | 446/148 |
| 2,946,137 | 7/1960 | Worth et al. | 446/147 X |
| 3,135,059 | 6/1964 | Barish | 35/66 |
| 3,605,287 | 9/1971 | Jonesi | 434/85 |
| 4,176,473 | 12/1979 | Rae | 446/147 X |
| 4,205,849 | 6/1980 | Perkins | 273/155 |
| 4,563,154 | 1/1986 | Vanderwort et al. | 434/87 |
| 4,611,994 | 9/1986 | Glover | 434/85 |
| 4,640,512 | 2/1987 | Burke | 434/406 X |

FOREIGN PATENT DOCUMENTS

1354022 of 1964 France .
332383 7/1930 United Kingdom .................. 434/87

OTHER PUBLICATIONS

Usborne, "Making Stencils", *Washington Post*, Oct. 5, 1975, Comic's Section.

*Primary Examiner*—Edward M. Coven
*Assistant Examiner*—William E. Stoll
*Attorney, Agent, or Firm*—Lewis H. Eslinger; Donald S. Dowden

[57] ABSTRACT

A book for children comprises a front cover, a back cover and a plurality of sheets forming a succession of pages between the front cover and the back cover. The sheets are die cut or perforated to form knockout plugs intended to be removed by the consumer. When the plugs are removed, the sheets form a stencil and define a work page bearing an illustration related to the stencil. A tutorial page adjacent to the work page and visible together with the work page when the book is opened to the work page illustrates the appearance of an image when properly drawn with the aid of the stencil. A binding for the covers and sheets enables the book to be opened to any of the pages and to lie with both of the covers and all of the pages flat. This facilitates the use of the book as a stencil book.

13 Claims, 8 Drawing Sheets

STENCIL BOOK

This is a continuation of application Ser. No. 103,738, filed Oct. 2, 1987, now abandoned, which was a continuation-in-part of application Ser. No. 849,530, filed Apr. 8, 1986, now abandoned.

BACKGROUND OF THE INVENTION

FIELD OF THE INVENTION

This invention relates to books and, more particularly, to a novel and highly-effective book for children having features that facilitate its use as a stencil book.

DESCRIPTION OF THE PRIOR ART

Stenciling is a valuable exercise for young children. It teaches hand-eye coordination and imparts information about the letters or other shapes that are being stenciled.

Conventional stencil aids, however, are not well adapted for use by young children. They tend to be inconvenient to use, because either they are not assembled and must be searched for individually as needed or they are assembled in such a manner that they cannot be used individually except with the exercise of more dexterity than a young child is likely to possess. Moreover, conventional stencil aids are generally available only in isolation from illustrations, explanations and other auxiliary teaching materials of benefit to young children.

OBJECTS AND SUMMARY OF THE INVENTION

An object of the invention is to remedy the shortcomings of conventional stencil aids noted above and in particular to provide a stencil aid that is especially attractive to, and adapted to the needs of, young children.

Another object of the invention is to provide a stencil aid that includes auxiliary teaching materials of benefit to young children.

Another object of the invention is to provide a book that is intended for use as a stencil book and designed so that it is less expensive to manufacture than conventional stencil books.

BRIEF DESCRIPTION OF THE DRAWING

A better understanding of the objects, features and advantages of the invention can be gained from the following detailed description of the preferred embodiments thereof, wherein a given reference character always represents the same element or part, and wherein.

DESCRIPTION OF THE PREFERRED EMBODIMENTS

Figure 1:
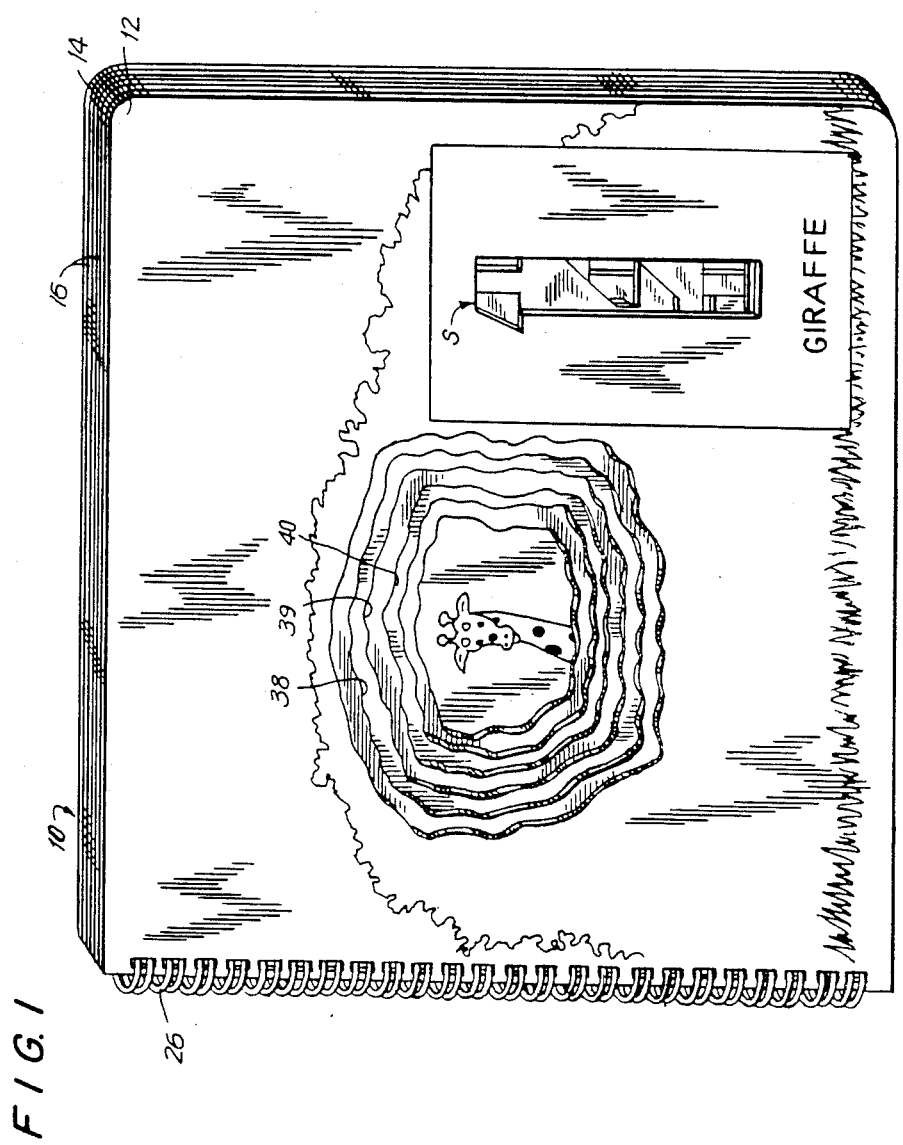
FIG. 1 is a front perspective view of a book for children in the closed state, showing the book as it appears after the removal of knockout plugs provided in accordance with the invention.
Figure 8:
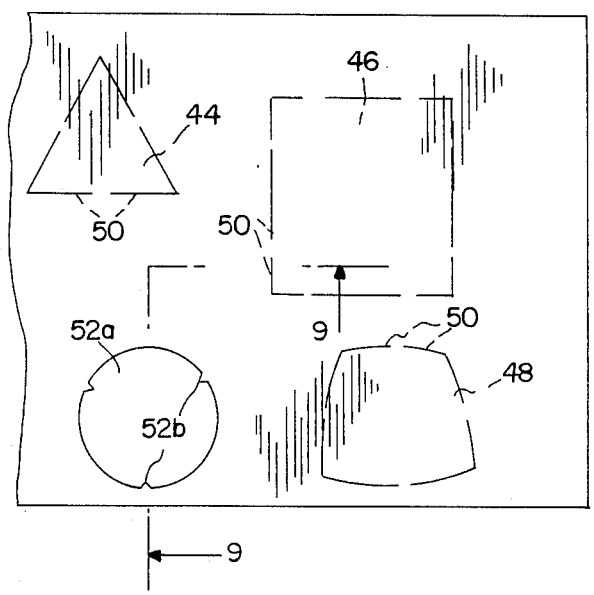
FIG. 8 is a framentary plan view of a portion of a book in accordance with the invention, showing a feature that simplifies the manufacturing process and reduces the cost thereof.
Figure 9:
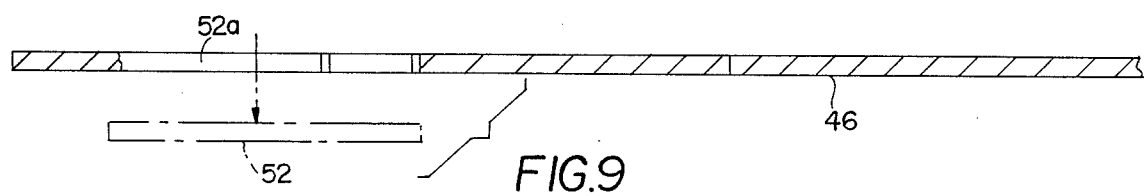
FIG. 9 is a view taken substantially along the broken line 9—9 in FIG. 8 and looking in the directions respectively indicated by the arrows.

FIG. 1 shows a book 10 constructed in accordance with the invention, as it appears after the removal of knockout plugs provided in accordance with the invention and shown in FIGS. 8 and 9. The book of FIG. 1 comprises a front cover 12, a back cover 14, and plurality of sheets 16 forming a succession of pages 18, 20, etc. (FIG. 2), between the front cover 12 and the back cover 14. The covers and sheets are all the same size and formed of a stiff cardboard-like material of substantial thickness. The book is therefore of rugged construction to withstand handling by young children.

The book 10 further comprises a spiral-type, ring-type, wire-0 type, or similar binding 26 for the covers 12, 14 and sheets 16 enabling the book 10 to be opened to any of the pages 18, 20, etc., and to lie with both of the covers 12, 14 and all of the pages 18, 20, etc., perfectly flat. This facilitates use of the book 10 as a stencil book, since the book 10 has no tendency to close while it is in use.

At least one and preferably all of the sheets 16 and even the covers 12, 14 are die cut to form a stencil S. For example, in FIG. 2, the sheet 16 the recto side of which forms the page 20 is die cut to form a stencil S outlining the numeral "2". The page 20 is a work page bearing an illustration related to the stencil S. For example, a pair of elephants 22 illustrates the concept of the numeral "2".

The verso side of the sheet 16 preceding the page 20 forms the page 18. The page 18 is a tutorial page adjacent to the work page 20 and visible together with the work page 20 when the book 10 is opened to the work page 20. The work page 20 is to the right of the tutorial page 18, thereby making it easy for a right-handed child to perform the stenciling while occasionally glancing at the tutorial page. The tutorial page 18 includes an illustration 24 showing on a reduced scale the finished appearance of an image properly drawn with the aid of the stencil S.

Figure 2:
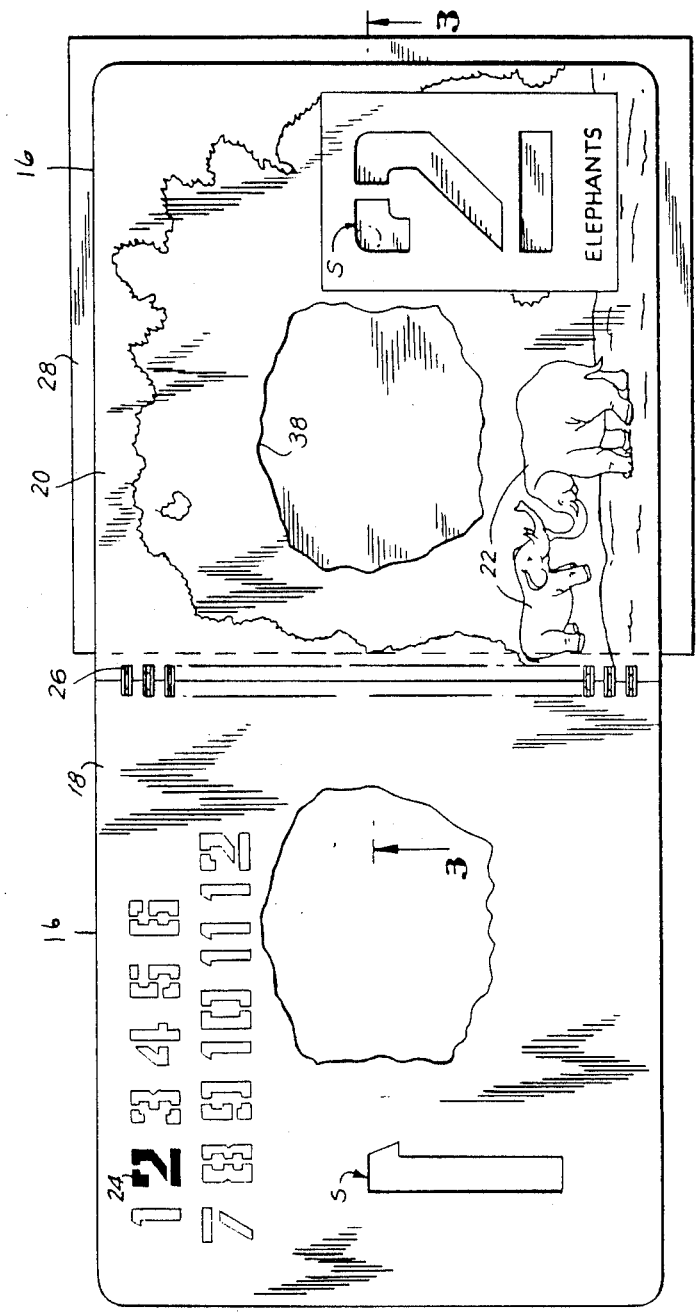
FIG. 2 is a plan view of the book of FIG. 1 in the open state.

As FIG. 2 shows, the stencil S may represent a number. A series of numbers, for example "1" to "12", may be included in the book as stencils respectively cut into sheets forming separate work pages. The tutorial page opposite each work page may include printed representations of all of the stencils, namely the numerals "1" to "12" in the example, wherein the numeral corresponding to the stencil S on the associated work page is darkened or filled in with a solid color, the other numerals being left unshaded (i.e., in outline form). For example, as indicated in FIG. 2, all of the numerals "1" through "12" are represented on the tutorial page 18, but only the numeral "2" is darkened, the numerals "1" and "3" through "12" being left unshaded. This is a teaching aid that shows a young child what the stenciling looks like if done properly. The concept of the shape being stenciled is reinforced by seeing the stencil in a plurality of ways (die cut on the work page, filled in on the tutorial page, and filled in on the child's own work sheet at the completion of the stenciling).

Figure 4:
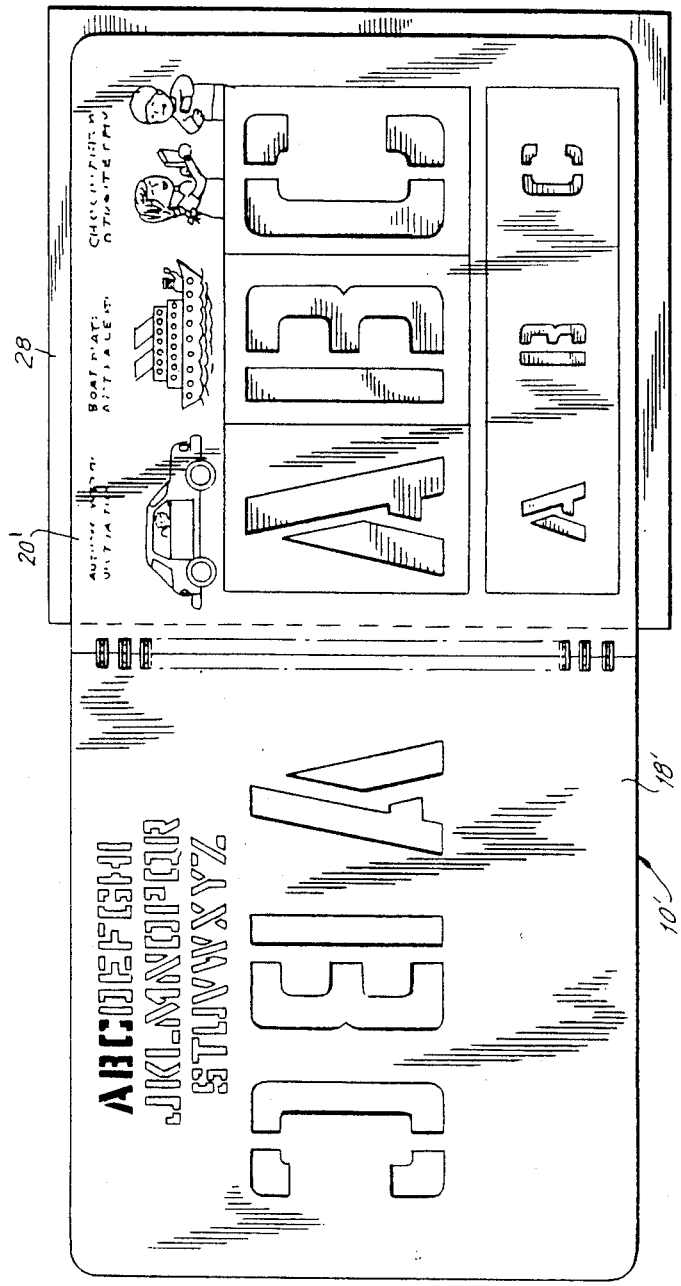
FIG. 4 is a plan view similar to FIG. 2 but showing another embodiment of the invention.

As an alternative to a stencil book of numbers, it is also possible to manufacture a stencil book of letters, as illustrated in FIG. 4. In FIG. 4, the work page 20' includes stencils representing three letters, namely "A", "B", and "C". The tutorial page 18' includes those letters plus the remaining letters of the alphabet. The letters "A", "B", and "C" are filled in on the tutorial page 18', for example in a dark solid color, and the remaining letters are left unshaded.

The work page 20' includes illustrations respectively associated with these stencils: for example, an illustration of an automobile in association with the stencil representing the letter "A", an illustration of a boat in association with the stencil representing the letter "B", and an illustration of chocolate in association with the stencil representing the letter "C". The same letters appear in small form below the large letters. It is also possible, of course, to substitute lower-case letters, Greek letters, etc.

Succeeding work pages of the book 10' of FIG. 4 represent succeeding letters of the alphabet grouped in units of three and include appropriate illustrations relating thereto; and, on each tutorial page, all the letters of the alphabet are represented, the three letters corresponding to the stencils on the associated work page being filled in.

Figure 5:
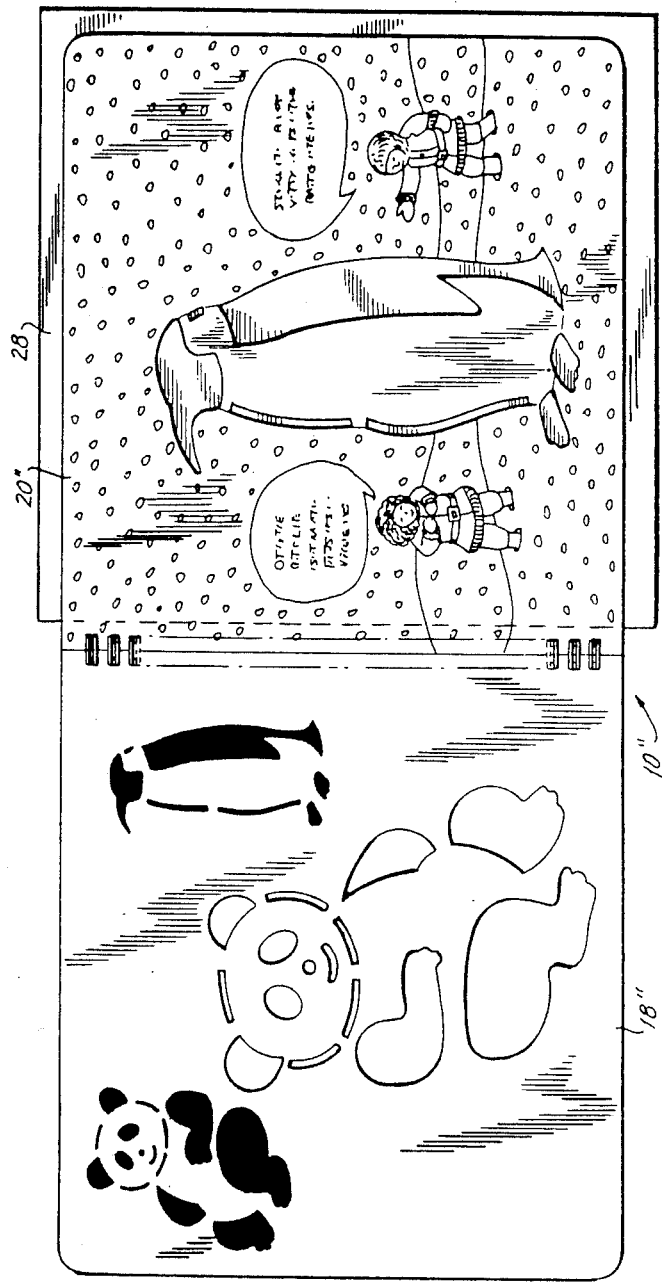
FIG. 5 is a plan view similar to FIGS. 2 and 4, but showing another embodiment of the invention.

FIG. 5 shows another embodiment of a book 10" constructed in accordance with the invention and representing animals. A work page 20" includes a stencil representing a penguin, for example. Cartoon characters on the work page are represented as giving information about the animal in question and its natural habitat. For example, in the case of the penguin, the cartoon characters may indicate that it is native to Antarctica and that Antarctica has a cold climate. The associated tutorial page 18" includes a representation of a penguin filled in to show the appearance of the completed stencil if the child performs the stenciling properly.

Figure 10:
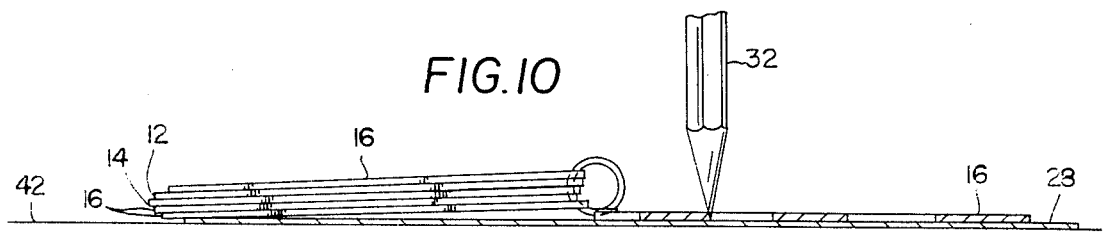
FIG. 10 illustrates the preferred mode of use of a book constructed in accordance with the invention.

A sheet of paper 28 is shown inserted beneath the work page 20" so that the stenciling can be performed. Because of the provision of the spiral-type, ring-type or similar binding 26 as disclosed above, the book, including both of its covers and all of its pages, can be opened through a full 360° without undergoing any damage, and it is possible for a young child to configure the book so that only the sheet including the work page in use extends to the right of the binding 26, both covers and all of the other sheets of the book extending to the left of the binding 26, as illustrated in FIG. 10. When the book is configured in this way, the sheet of paper 28 can be made to rest directly on an external supporting surface such as a board, floor, plastic desk top, table top, or other firm, solid, scratch-resistant support 42, thereby facilitating the stenciling operation. The sheet of paper 28 can be inexpensive and need not be especially rigid or puncture resistant, since when used in this way it does not overlie another stencil.

In the absence of a spiral-type, ring-type or similar binding 26 as disclosed above, the book covers and pages can be opened only through about 180° without damaging the book. In this case, it is not possible, without damaging the book, to configure the book in the manner illustrated in FIG. 10, wherein the covers 12 and 14 lie adjacent to each other and extend to the left of the binding 26 with all of the sheets 16 but one, and a single sheet 16 extends to the right of the binding 26 for cooperation with the child's pencil or other writing implement 32.

Figure 3:
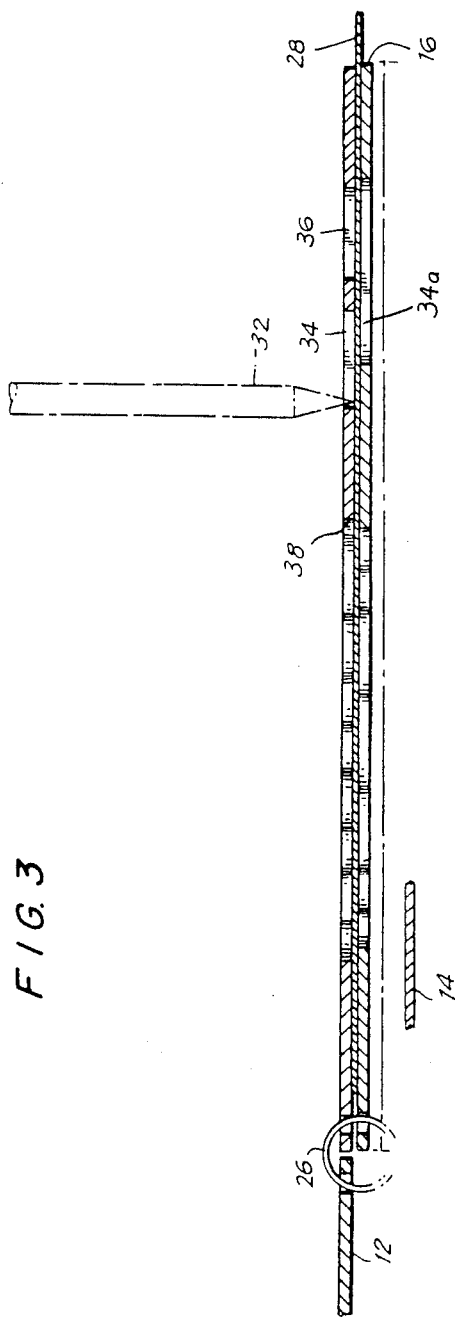
FIG. 3 is a sectional view taken substantially along the line 3—3 of FIG. 2 and looking in the direction of the arrows.

In FIG. 3, the paper 28 overlies another stencil. If voids in the stencil in use are in part directly above voids in the stencil under the sheet 28, the pencil, pen or other implement 32 may punch through the paper 28 where the voids overlap, since at such overlapping voids the paper 28 is not properly supported. In the case of a stencil book that in use must be configured as in FIG. 3, it is necessary, in order to avoid punching holes in the paper 28, to ensure that voids in each stencil are wholly out of register (i.e., misaligned) with voids in the stencil immediately therebelow, which limits the design of the stencil book, or to employ a more expensive, rigid substitute for the sheet of paper 28.

The spiral-type, ring-type or similar binding 26 provided in accordance with the invention, which can be opened a full 360°, imposes no design limitation on the stencil book and makes it unnecessary to use a rigid or expensive material for the sheet of paper 28 yet ensures that the pencil, pen or other implement 32 employed to perform the stenciling will not puncture the sheet of paper 28 so long as it is properly supported on a surface 42 as shown in FIG. 10.

Figure 6:
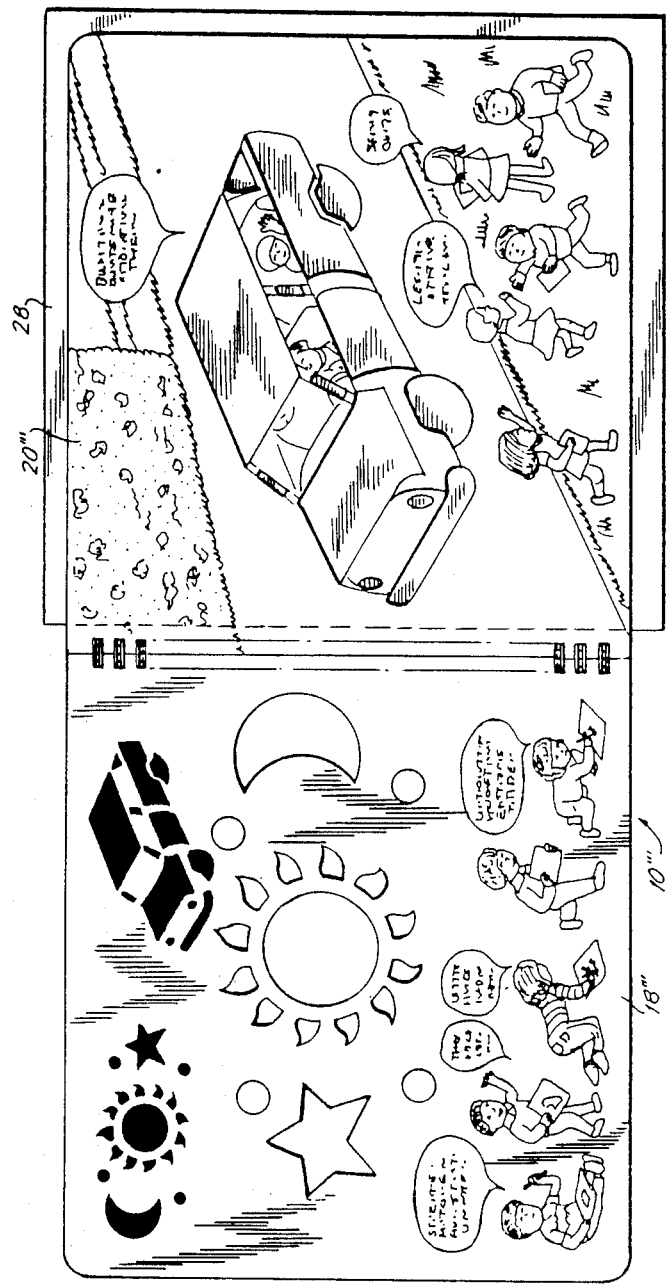
FIG. 6 is a view similar to FIGS. 2, 4 and 5 but showing another embodiment of the invention.

FIG. 6 shows another embodiment of a book 10''' constructed in accordance with the invention and opened to a representative tutorial page 18''' and work page 20'''. The work page 20''' includes a stencil representing a car on a roadway. Cartoon characters are represented as making comments appropriate to the situation depicted. The associated tutorial page 18''' includes a representation of a car as it will appear if the child performs the stenciling properly. Cartoon characters on the tutorial page 18''' are represented as making comments appropriate to the use of the stencil book.

Figure 7:
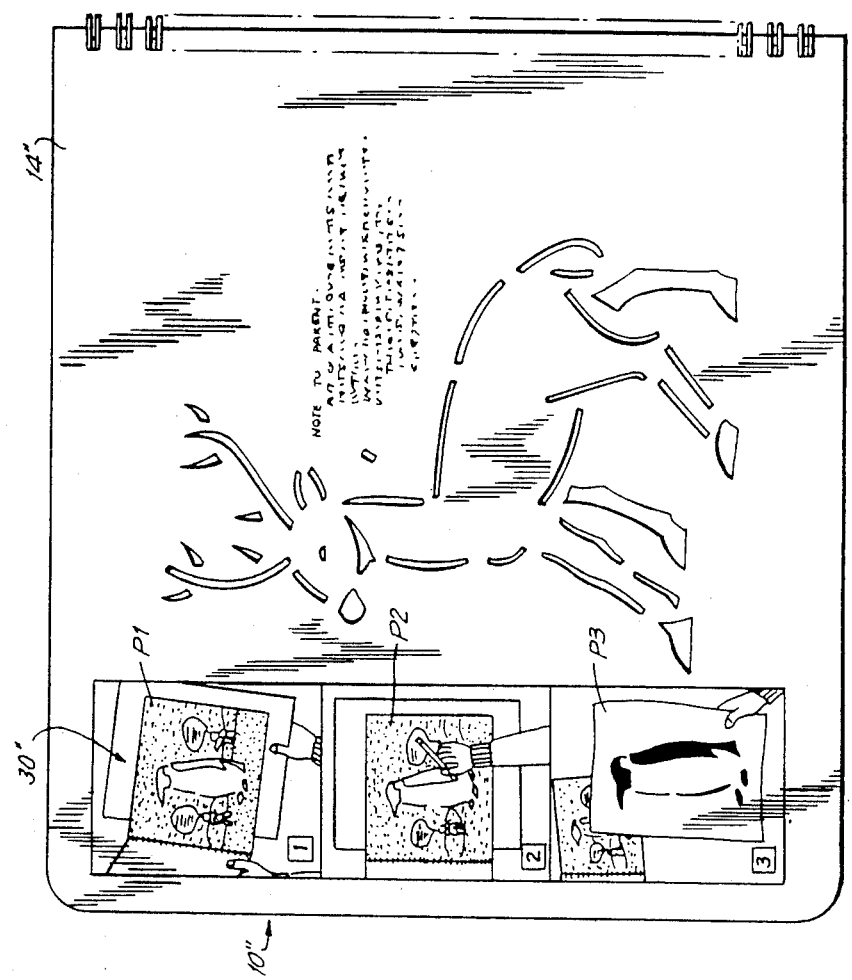
FIG. 7 is a plan view of the back cover of a book constructed in accordance with the invention and containing a heuristic device.

FIG. 7 shows a back cover 14" of the animal book 10". A teaching aid 30" illustrates in three panels the art of stenciling. In the first panel P1 is a representation of the work page 20" before stenciling begins. In a second panel P2 is a representation of the work page 20" as stenciling proceeds. A third panel P3 contains a representation of the completed stencil.

In FIG. 3, a pencil or crayon, etc., 32 is within a die-cut opening 34 tracing a portion of the outline of the numeral "2". An opening 36 representing another portion of the numeral "2" is also visible in FIG. 3. The paper 28 is also shown, as well as sheets 16 below the paper 28. The binding 26 enables all of the pages, as well as the front and back covers 12, 14, to lie flat. If the void 34 of the stencil in use partly overlaps the void 34a of the stencil immediately therebelow, the paper 36 should be puncture resistant for reasons explained above.

It is within the scope of the invention to include a purely decorative opening 38. A plurality of such openings 38, 39, 40, etc., of progressively decreasing size may be provided to form a frame (FIG. 1) for a picture which is printed on the inside of the back cover and visible from the front of the book when the book is closed. The decorative stencil may be unrelated to the stencil representing the numeral, letter of the alphabet, animal or object, and lends added interest to the book as an educational book for a young child.

FIGS. 8 and 9 show in part the appearance of a typical stencil as manufactured. Knockout plugs such as 44, 46 and 48 (FIG. 8) are formed by perforations 50. FIG.

9 shows in phantom outline the removal of a plug 52, thereby forming an aperture 52a. Remnants 52b of the attachment of the plug 52 to the stencil are visible in FIG. 9. Alternatively, the knockout plugs can be formed by cuts that do not extend through the sheets but leave membranes that are thin, continuous around the knockout plugs, and easily ruptured by the user after purchase of the book. The book is intended to be sold with the knockout plugs in the stencil so that they can be removed by the consumer after purchase of the book.

One advantage of this construction is that the manufacturing process does not need to deal with the plugs and in particular need not provide for collection and disposal thereof. This simplifies the process and reduces its cost.

Another advantage is that the plugs when removed by the consumer form, together with the stencil, a sort of jigsaw puzzle that can entertain young children and educate them about shapes. For example, children can learn from the stencil of FIGS. 8 and 9 that a round piece such as the knockout plug 52 will fit in the round aperture 52a but will not fit properly in a triangular hole formed by removal of the triangular knockout plug 44. Thus although a book constructed in accordance with the invention functions primarily as a stencil book, it has educational value and entertainment value beyond those of conventional stencil books.

Thus there is provided in accordance with the invention a novel a highly-effective book for children having features that facilitate its use as a stencil book. The book remedies the shortcomings of conventional stencil aids and in particular provides a stencil aid that is especially attractive to, and adapted to the needs of, young children. More particularly, in accordance with the invention a stencil aid is provided that includes auxiliary teaching materials of benefit to young children, that can be provided inexpensively to the consumer, and that has greater educational and entertainment value than conventional stencil books.

Many modifications of the preferred embodiments of the invention disclosed herein will readily occur to those skilled in the art. For example, it is possible to incorporate all of the features described above relating to numerals, letters, animals and objects into a single book. It is also possible to have different categories of books (for example, occupations, sports, foods, etc.). Accordingly, the invention is not limited except by the appending claims.

What is claimed:

1. A stencil book for children comprising:
   a front cover;
   a back cover;
   a plurality of flat sheets forming a succession of pages between said front cover and said back cover, at least one of said sheets being cut to form a stencil and defining a work page bearing an illustration separate from and related to a concept embodied in said stencil, said front cover, said back cover, and said sheets being formed of a stiff cardboard-like material of substantial thickness;
   a tutorial page adjacent to said work page and visible together with said work page when said book is opened to said work page, said tutorial page illustrating the appearance of an image when properly drawn with the aid of said stencil;
   a binding means for said covers and sheets forming a hinge for said front cover, said back cover, said work page and said tutorial page and enabling said book to be opened through a full 360° to any of said pages and to lie with both of said covers and all of said pages flat, thereby facilitating use of said book as a stencil book; and
   a sheet of paper on which stenciling can be performed, said sheet of paper being insertable beneath said work page so that it is pressed between said work page and an external supporting surface during use of said book as a stencil book.

2. A book according to claim 1 wherein said stencil represents a number.

3. A book according to claim 1 wherein said stencil represents a letter.

4. A book according to claim 1 wherein said stencil represents an animal.

5. A book according to claim 1 wherein said stencil represents an object.

6. A book according to claim 1 wherein said front cover is cut to form a stencil.

7. A book according to claim 1 wherein said work page is cut to form a second stencil.

8. A book according to claim 1 wherein said work page is to the right of said tutorial page, thereby facilitating use of said book by a right-handed child.

9. A book according to claim 1 wherein said binder is a spiral type.

10. A book according to claim 1 wherein said binder is a ring type.

11. A book according to claim 1 wherein said binder is a wire-O type.

12. A stencil book for children comprising:
    a front cover;
    a back cover;
    a plurality of flat sheets forming a succession of pages between said front cover and said back cover, at least one of said sheets being cut to form knockout plugs for later removal to form a stencil and defining a work page bearing in illustration separate from and related to a concept embodied in said stencil, said front cover, said back cover, and said sheets being formed of a stiff cardboard-like material of substantial thickness;
    a tutorial page adjacent to said work page and visible together with said work page when said book is opened to said work page, said tutorial page illustrating the appearance of an image when properly drawn with the aid of said stencil;
    a binding means for said covers and sheets forming a hinge for said front cover, said back cover, said work page and said tutorial page and enabling said book to be opened through a full 360° to any of said pages and to lie with both of said covers and all of said pages flat, thereby facilitating use of said book as a stencil book; and
    a sheet of paper on which stenciling can be performed, said sheet of paper being insertable beneath said work page so that it is pressed between said work page and an external supporting surface during use of said book as a stencil book;
    thereby making it unnecessary to deal with said knockout plugs during the manufacturing process and enabling selective removal and reinsertion of said knockout plugs by an end user and giving said book additional educational and entertainment value.

13. A book according to claim 12 wherein said cuts form perforations.

* * * * *